United States Patent Office 2,746,946
Patented May 22, 1956

2,746,946

VINYL RESINS STABILIZED WITH ORGANOTIN SULFIDES

Elliott L. Weinberg, Long Island City, N. Y., and Hugh E. Ramsden, Metuchen, N. J., assignors to Metal & Thermit Corporation, New York, N. Y., a corporation of New Jersey No Drawing. Application January 11, 1952, Serial No. 266,084

16 Claims. (Cl. 260—45.75)

The present invention relates to the stabilization of vinyl compositions and especially to the stabilization of polymeric resins containing vinyl chloride units.

It has been found in accordance with the present invention that the addition of organotin sulfides to a resin containing vinyl chloride groups stabilizes the resin against the deleterious effect of heat and light and retards materially the destructive effect of aging. The organotin sulfide compound found particularly useful for the purpose has the general formula $R_2SnS$ in which R is an aliphatic group and especially an alkyl group having one to eighteen carbon atoms or an aryl group having no more than eighteen carbon atoms. The amount of this compound found effective as a stabilizer is 0.5 to 10%, based on the weight of the polymeric composition and a preferred amount is about 2%.

The organotin sulfide contemplated as a stabilizer in accordance with the present invention may be prepared by standard techniques. For example, it may be prepared as described in Kotscheschov, K. Bev. 56, 1661 (1933), disclosing a process of making dimethyl tin sulfide. Other organotin sulfides may be similarly made except for the use of alcohol in the process instead of water.

The following examples illustrate certain ways in which a polymeric composition containing vinyl chloride units may be stabilized by the organotin sulfide of the present invention, but they are not to be construed as limiting the broader aspects of the invention.

Example I

Two (2) parts by weight of dimethyl tin sulfide were added to a polymeric resin composition containing 100 parts of Ultron 300 (Monsanto) vinyl chloride resin and 50 parts of dioctyl phthalate (plasticizer). The mixture was milled at 320° F. and samples were press-polished. Strips were then oven-aged at 320° F. After four hours of oven aging, the resin was only slightly yellow. This compares favorably with control samples prepared exactly the same way, except for the absence of a stabilizer and tested under the same conditions. The samples without stabilizer so tested appeared reddish brown at the end of the first hour of oven aging and black at the end of the second hour.

Comparative tests carried out to determine stability to light, as for example by exposure to Atlas Fadeometer of an unstabilized resin composition containing vinyl chloride units and a stabilized resin composition of the present invention, will indicate the marked superiority of the stabilized product.

Example II

Two (2) parts by weight of dibutyl tin sulfide were added to a polymeric resin composition containing 100 parts of Geon 101 EP (Goodrich) vinyl chloride resin and 50 parts of dioctyl phthalate. The mixture was processed as in the case of Example I and tested. After four hours of oven-aging, the stabilized resin was found light tan in color.

Example III

Two (2) parts by weight of dilauryl tin sulfide dispersed uniformly throughout a polymeric resin containing 100 parts of Ultron 300 or Geon 101 EP and 50 parts of dioctyl phthalate will produce a stabilized product as in the case of Examples I and II.

Example IV

Two (2) parts by weight of diphenyl tin sulfide uniformly mixed with a polymeric resin containing 100 parts of Ultron 300 or Geon 101 EP and 50 parts of dioctyl phthalate will produce a stabilized product as in the case of Examples I and II.

Although the organotin sulfide of the present invention is particularly useful as a stabilizer in connection with polymeric resins containing vinyl chloride groups, as far as certain aspects of the invention are concerned, it is useful in connection with polymeric resins containing vinylidene chloride units.

While the invention has been described with particular reference to specific embodiments, it is to be understood that it is not limited thereto but is to be construed broadly and restricted solely by the scope of the appended claims.

What is claimed is:

1. A composition comprising a chlorine containing vinyl resin and a stabilizing amount of a hydrocarbontin sulfide the hydrocarbon groups of which are bonded to tin and the sulfur bonded only to tin.

2. A composition comprising a chlorine containing vinyl resin and 0.5 to 10% by weight of a hydrocarbontin sulfide the hydrocarbon groups of which are bonded to tin and the sulfur bonded only to tin.

3. A composition comprising a chlorine containing vinyl resin and a stabilizing amount of a hydrocarbontin sulfide having the general formula $R_2SnS$, wherein R is a radical of the class consisting of an alkyl containing from 1 to 18 carbon atoms and an aryl.

4. A composition comprising a chlorine containing vinyl resin and 0.5% to 10% by weight of a hydrocarbontin sulfide having the general formula $R_2SnS$, wherein R is a radical of the class consisting of an alkyl containing from 1 to 18 carbon atoms and an aryl.

5. A composition comprising a chlorine containing vinyl resin and about 2% by weight of a hydrocarbontin sulfide having the general formula $R_2SnS$, wherein R is a radical of the class consisting of an alkyl containing from 1 to 18 carbon atoms and an aryl.

6. A composition comprising a chlorine containing vinyl resin and a stabilizing amount of an alkyltin sulfide the alkyl groups of which are bonded to tin and sulfur bonded only to tin.

7. A composition comprising a chlorine containing vinyl resin and a stabilizing amount of an aryltin sulfide the aryl groups of which are bonded to tin and sulfur bonded only to tin.

8. A composition comprising a chlorine containing vinyl resin and a stabilizing amount of dimethyl tin sulfide.

9. A composition as defined in claim 8, wherein the dimethyl tin sulfide constitutes 0.5% to 10% by weight of the resin.

10. A composition comprising a chlorine containing vinyl resin and a stabilizing amount of dibutyl tin sulfide.

11. A composition as defined in claim 10, wherein the dibutyl tin sulfide constitutes 0.5% to 10% by weight of the resin.

12. A composition comprising a chlorine containing vinyl resin and a stabilizing amount of dilauryl tin sulfide.

13. A composition as defined in claim 12, wherein the dilauryl tin sulfide constitutes 0.5% to 10% by weight of the resin.

14. A composition comprising a chlorine containing vinyl resin and a stabilizing amount of diphenyl tin sulfide.

15. A composition as defined in claim 14, wherein the diphenyl tin sulfide constitutes 0.5% to 10% by weight of the resin.

16. A composition comprising a chlorine containing vinyl resin and a stabilizing amount of a hydrocarbontin sulfide having from 1 to 18 carbon atoms for each hydrocarbon group and selected from the class consisting of alkyltin sulfides and aryltin sulfides, the hydrocarbon groups of which are bonded to tin and sulfur bonded only to tin.

References Cited in the file of this patent

UNITED STATES PATENTS

| | | |
|---|---|---|
| 2,267,777 | Yngve | Dec. 30, 1941 |
| 2,597,920 | Carroll | May 27, 1952 |
| 2,648,650 | Weinberg | Aug. 11, 1953 |